(12) United States Patent
Ishino

(10) Patent No.: US 8,912,777 B2
(45) Date of Patent: *Dec. 16, 2014

(54) CONTROL CIRCUIT AND CONTROL METHOD FOR SWITCHING POWER SUPPLY, AND SWITCHING POWER SUPPLY AND ELECTRONIC APPARATUS USING CONTROL CIRCUIT AND CONTROL METHOD

(75) Inventor: Tsutomu Ishino, Kyoto (JP)

(73) Assignee: Rohm Co., Ltd. (JP)

( * ) Notice: Subject to any disclaimer, the term of this patent is extended or adjusted under 35 U.S.C. 154(b) by 70 days.

This patent is subject to a terminal disclaimer.

(21) Appl. No.: 13/586,289

(22) Filed: Aug. 15, 2012

(65) Prior Publication Data
US 2013/0043851 A1 Feb. 21, 2013

(30) Foreign Application Priority Data
Aug. 18, 2011 (JP) ................................. 2011-179149

(51) Int. Cl.
G05F 1/00 (2006.01)
H02M 3/156 (2006.01)
H02M 1/00 (2006.01)

(52) U.S. Cl.
CPC ...... *H02M 3/156* (2013.01); *H02M 2001/0035* (2013.01); *Y02B 70/16* (2013.01)
USPC .......................................................... 323/282

(58) Field of Classification Search
USPC .................. 323/222, 282, 283, 284, 285, 351
See application file for complete search history.

(56) References Cited

U.S. PATENT DOCUMENTS

| | | | | |
|---|---|---|---|---|
| 5,481,178 A * | 1/1996 | Wilcox et al. | .................. | 323/287 |
| 2002/0057082 A1 * | 5/2002 | Hwang | .......................... | 323/284 |
| 2005/0258811 A1 * | 11/2005 | Matsuo et al. | ................. | 323/282 |
| 2008/0315851 A1 * | 12/2008 | Akiyama et al. | .............. | 323/284 |
| 2010/0283442 A1 * | 11/2010 | Nakashima | .................... | 323/283 |
| 2011/0001461 A1 * | 1/2011 | Lu et al. | ......................... | 323/283 |

FOREIGN PATENT DOCUMENTS

| | | |
|---|---|---|
| JP | 6-6969 A | 1/1994 |
| JP | 7-222438 A | 8/1995 |
| JP | 9-266664 A | 10/1997 |
| JP | 10-108457 A | 4/1998 |
| JP | 2005-261009 A | 9/2005 |
| JP | 2008-172909 A | 7/2008 |

* cited by examiner

*Primary Examiner* — Gary L Laxton
*Assistant Examiner* — Alex Torres-Rivera
(74) *Attorney, Agent, or Firm* — Cantor Colburn LLP

(57) ABSTRACT

The present invention improves the efficiency of a switching power supply in a light load. A control circuit is configured to repeat a driving duration enabling the switching element to be switched and a stop duration stopping the switching in a light load state. A pulse signal generating portion generates a driving pulse signal, in which the driving pulse signal at least includes a pulse in the driving duration, and the lighter a load is, the less the number of pulses in the driving duration is. A first driver drives a first switching transistor according to the at least one pulse in the driving pulse signal other than predetermined K pulses (K is a natural number). The K pulses are in the driving pulse signal when the number of the pulses is reduced to K.

13 Claims, 12 Drawing Sheets

CONTROL CIRCUIT AND CONTROL METHOD FOR SWITCHING POWER SUPPLY, AND SWITCHING POWER SUPPLY AND ELECTRONIC APPARATUS USING CONTROL CIRCUIT AND CONTROL METHOD

BACKGROUND OF THE INVENTION

1. Field of the Invention

The present invention relates to a switching power supply.

2. Description of the Related Art

In order to generate a voltage higher than an input voltage or a voltage lower than the input voltage, a switching power supply is used. The switching power supply includes an output inductor, an output capacitor, a switching transistor and a control circuit used to control ON/OFF of the switching transistor.

In order to increase the efficiency of the switching power supply in a light load, sometimes an ON/OFF switching frequency of a switching element, that is, a switching frequency is reduced in the light load state. Therefore, a loss caused by an ON-state resistance of the switching element, a loss caused by a charging/discharging current of a gate capacitance of the switching element, and a loss of a rectifying element can be reduced.

PRIOR ART DOCUMENT

Patent Document 1: Japanese Patent Publication No. 9-266664

Patent Document 2: Japanese Patent Publication No. 6-006969

Patent Document 3: Japanese Patent Publication No. 10-108457

Patent Document 4: Japanese Patent Publication No. 2008-172909

Patent Document 5: Japanese Patent Publication No. 2005-261009

Patent Document 6: Japanese Patent Publication No. 7-222438

SUMMARY OF THE INVENTION

Problem to be Solved by the Invention

Generally, the larger the size of a switching element is, the smaller the ON-state resistance is, and so the efficiency in a heavy load state is increased.

On the other hand, if the size of the switching element is increased, a gate capacitance is increased, so the current required for switching the switching element is increased. Therefore, in a light load state, in the consumption current of a switching power supply, the proportion of a charging/discharging current of the gate capacitance (the gate driving current) is increased. That is, a trade off relationship exists between the efficiency in the heavy load and the efficiency in the light load with the size of the switching element used as a parameter.

According to above reason, the efficiency of the switching power supply designed with the emphasis on the efficiency in the heavy load is worsened in the light load.

The present invention is completed in view of the topic, and in an embodiment thereof, one of exemplary objectives lies in providing a switching power supply whose efficiency is improved in a light load.

Technical Means for Solving the Problem

An embodiment of the present invention relates to a control circuit for a boost, buck or buck-boost switching power supply including a switching element. The switching element includes a first switching transistor and a second switching transistor smaller than the first switching transistor whose respective control terminals are independent of each other and which are disposed side by side. The control circuit is configured to repeat a driving duration enabling the switching element to be switched and a stop duration stopping the switching element from being switched in a light load state. The control circuit includes: a pulse signal generating portion, for generating a driving pulse signal, wherein the driving pulse signal at least includes a pulse in the driving duration, and the lighter a load is, the less the number of pulses in the driving duration is; a first driver, for driving the first switching transistor according to the at least one pulse in the driving pulse signal other than predetermined K pulses (K is a natural number); and a second driver, for driving the second switching transistor according to the at least K pulses in the driving pulse signal. The K pulses are in the driving pulse signal when the number of the pulses is reduced to K.

According to above embodiment, in a heavy load where a driving pulse signal includes more than K pulses, a first switching transistor with a large size, that is, with a small ON-state resistance is switched, so high efficiency can be obtained.

If it is in a light load state, the number of pulses in the driving pulse signal is reduced to K, the first switching transistor is not switched anymore, while a second switching transistor with a small size, that is, with a small gate capacitance is switched, so the gate driving current can be reduced, and the efficiency in the light load can be increased.

The pulse signal generating portion includes: a first oscillator, for generating a first period signal of a first frequency; a second oscillator, for generating a second period signal of a second frequency lower than the first frequency and having a slope portion; an error amplifier, for generating an error signal, wherein the error signal is corresponding to an error between a feedback signal denoting an electric state of the switching power supply and a predetermined reference voltage; a first pulse modulator, according to the signal corresponding to the error signal and the first period signal, for generating a first pulse signal having the first frequency and having a pulse width corresponding to the error signal, and clamping the pulse width of the first pulse signal at a predetermined first minimum pulse width; a second pulse modulator, for generating a second pulse signal having a pulse width corresponding to the error signal by comparing the signal corresponding to the error signal and the second period signal; and a synthesis portion, for synthesizing the first pulse signal and the second pulse signal to generate the driving pulse signal.

In the heavy load state, the pulse width of the first pulse signal is regulated; in the light load state, the pulse width of the first pulse signal is fixed to a first minimum pulse width, the pulse width of the second pulse signal is changed according to the load, and the first pulse signal is masked. As a result, in the light load state, the number of pulses can be reduced, the efficiency can be increased, and the switching frequency can be fixed at the second frequency.

In the embodiment, the pulse width of the second pulse signal becomes a driving duration. That is, the number of first pulse signals in the driving duration can be changed according to the pulse width of the second pulse signal.

The first pulse modulator shortens the pulse width of the first pulse signal as the error signal is reduced, and clamps the pulse width of the first pulse signal at the first minimum pulse width when the error signal is smaller than a certain threshold level; and the second pulse modulator, in a state that the pulse width of the first pulse signal is clamped, shortens the pulse width of the second pulse signal as the error signal is reduced.

The first period signal has a slope portion changing between a first lower limit level and a first upper limit level higher than the first lower limit level. The second period signal changes between a second lower limit level lower than the first lower limit level and a second upper limit level higher than the second lower limit level; the first pulse modulator generates the first pulse signal by comparing the error signal and the first period signal; and the second pulse modulator generates the second pulse signal by comparing the error signal and the second period signal.

The second upper limit level is set to be higher than the first lower limit level, thereby eliminating a dead band.

An embodiment of the control circuit further includes a mask signal generating portion, wherein the mask signal generating portion generates a mask signal being at a predetermined level in a mask duration comprising the K pulses. The first driver stops driving the first switching transistor in a duration when the mask signal is at the predetermined level, and drives the first switching transistor according to the driving pulse signal in durations other than the duration. The second driver drives the second switching transistor according to the driving pulse signal at least in the duration when the mask signal is at the predetermined level.

According to above embodiment, K=1 is proposed.

Another embodiment of the present invention is a switching power supply. The switching power supply includes: a switching transistor; an output circuit comprising an inductance element connected to the switching transistor, an output capacitor, and a rectifying element; and the control circuit according to above embodiment, for driving the switching transistor.

Still another embodiment of the present invention is an electronic apparatus. The electronic apparatus includes the switching power supply.

Furthermore, any combination of the constituent elements of the present invention and those achieved through substitution of methods, devices and systems can also be used as embodiments of the present invention.

Effects of the Present Invention

According to an embodiment of the present invention, the efficiency of the switching power supply in the light load can be improved.

DETAILED DESCRIPTION OF THE INVENTION

The present invention based on the preferred embodiment is described below with reference to the accompanying drawings. The same or equal element, part, or process, contained in each of the accompanying drawings, will be denoted by a same symbol, and the repeat descriptions for them will be omitted suitably. Furthermore, the embodiment should not be limited to the descriptions of the invention. In other words, all of the features and the combinations thereof mentioned in the embodiment are not necessarily the same as the substantive features of the invention.

In the specification, so-called connection between part A and part B includes a directly connection between part A and part B in physically and an indirectly connection between part A and part B through other part that does not affect their electrically connection substantially or does not damage the performance or effect of their combination. Similarly, so-called a state of part C disposing between part A and part B includes a directly connection between part A and part C or between part B and part C and an indirectly connection between them through other part that does not affect their electrically connection substantially or does not damage the performance or effect of their combination.

First Embodiment

Figure 1:
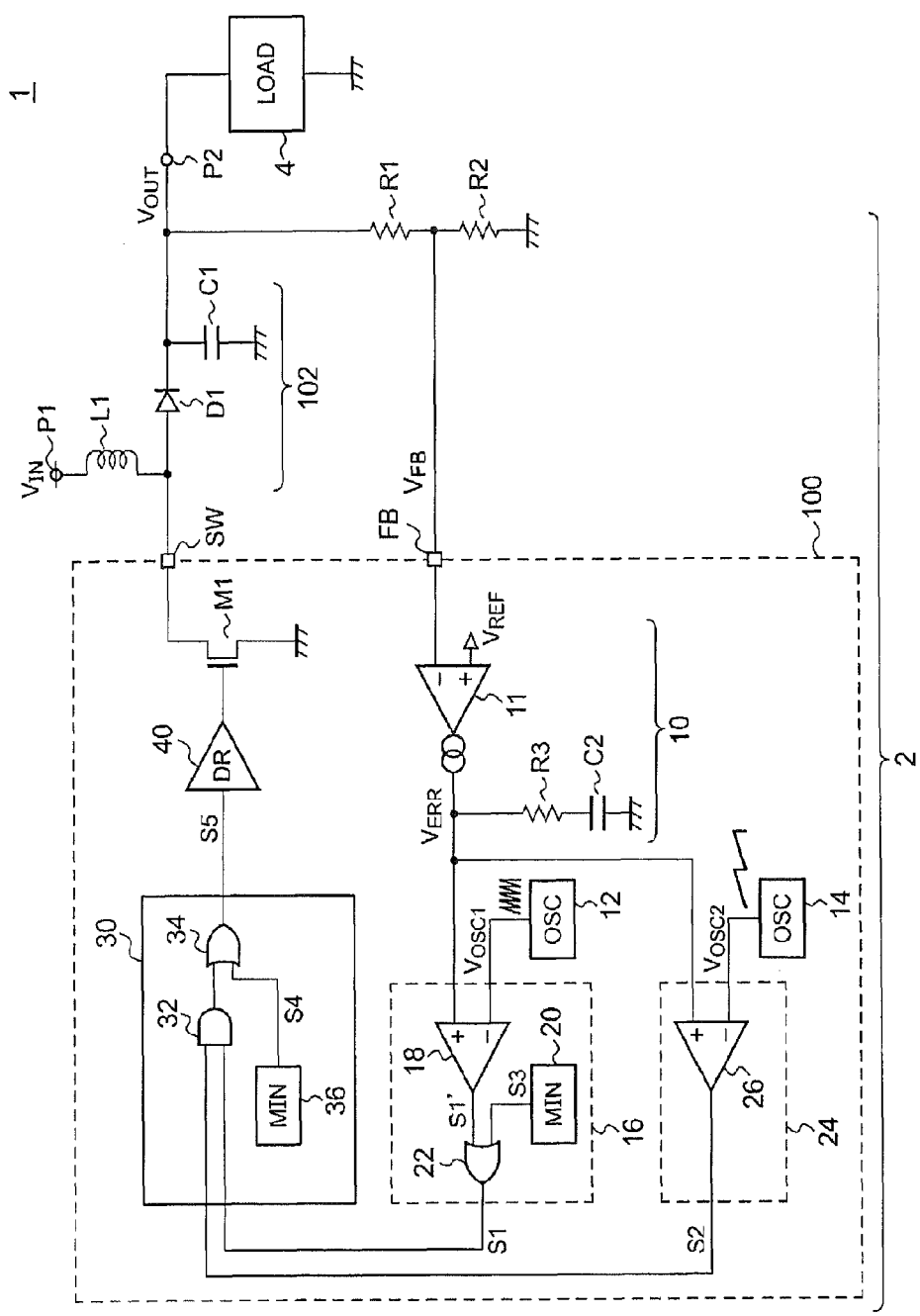
FIG. 1 is a circuit diagram denoting a structure of an electronic apparatus including a switching power supply according to a first embodiment.

FIG. 1 is a circuit diagram denoting a structure of an electronic apparatus 1 including a switching power supply 2 according to a first embodiment. The electronic apparatus 1 is a battery driving device such as a mobile phone terminal, a Personal Digital Assistant (PDA), a portable audio player, and a digital camera, and includes the switching power supply 2 and a load circuit 4. The switching power supply 2 is a boost DC/DC converter, receives a direct-current input voltage V from a battery or AC adapter not shown in the drawings at an input terminal P1 thereof, boosts the input voltage $V_{IN}$, and outputs an output voltage $V_{OUT}$ to the load circuit 4 connected to an output terminal P2. The load circuit 4 is a circuit which must have a voltage higher than a battery voltage as the power supply thereof, and is not specially limited.

The switching power supply 2 includes a switching transistor M1, an output circuit 102, and a control circuit 100. In FIG. 1, the switching transistor M1 is disposed in or out of the control circuit 100.

The switching power supply 2 is a voltage mode DC/DC converter for stabilizing the output voltage $V_{OUT}$ by use of feedback. After the output voltage $V_{OUT}$ is divided by resistors R1 and R2, a detection signal $V_{FB}$ corresponding to the output voltage $V_{OUT}$ is input to a feedback (FB) terminal of the control circuit 100.

The output circuit 102 includes an inductor L1, a rectifying element D1, and an output capacitor C1. The structure of the output circuit 102 is a smooth rectifying circuit of an ordinary boost DC/DC converter, so detailed description is omitted here. A synchronization rectifying transistor can also be disposed in place of the rectifying element D1.

The switching transistor M1 is disposed between a switching terminal SW connected to one end of the inductor L1 and a grounded terminal. The control circuit 100 switches the switching transistor M1 in a manner that the detection signal $V_{FB}$ corresponding to the output voltage $V_{OUT}$ as one of electric states of the switching power supply 2 approximates a predetermined reference value. Thereby, independent of the input voltage $Y_{IN}$ or the state of the load circuit 4, the output voltage $V_{OUT}$ is stabilized.

The control circuit 100, besides the switching transistor M1, further includes an error amplifier 10, a first oscillator 12, a second oscillator 14, a first pulse modulator 16, a second pulse modulator 24, a synthesis portion 30, a second minimum pulse width signal generating portion 36, and a driver 40.

The error amplifier 10 generates an error signal $V_{ERR}$, in which the error signal $V_{ERR}$ is corresponding to an error between a feedback signal $V_{FB}$ denoting the output voltage $V_{OUT}$ as an electric state of the switching power supply 2 and a predetermined reference voltage $V_{REF}$. The error amplifier 10, for example, includes a gm amplifier 11, a capacitor C2, and a resistor R3. The gm amplifier 11 generates an output current corresponding to the error between the feedback signal $V_{FB}$ and the reference voltage $V_{REF}$. The output current of the gm amplifier 11 is used to charge/discharge the capacitor C2, thereby generating the error signal $V_{ERR}$. The resistor R3 and the capacitor C2 further play the role of phase compensation. The voltage level of the error signal $V_{ERR}$ is increased when $V_{FB}>V_{REF}$, and is decreased when $V_{FB}<V_{REF}$.

The first oscillator 12 generates a first period signal $V_{OSC1}$ having a periodic slope portion. The frequency of the first period signal $V_{OSC1}$ is set to a first frequency $f_1$. For example, the first frequency $f_1$ is set to a value at which the switching power supply 2 is capable of implementing full feedback control in the high load state. The first period signal $V_{OSC1}$ can be a triangular wave or saw-tooth wave.

The second oscillator 14 generates a second period signal $V_{OSC2}$ having a periodic slope portion. The frequency of the second period signal $V_{OSC2}$ is set to a second frequency $f_2$ lower than the first frequency $f_1$. The second frequency $f_2$ is preferably set to a frequency higher than 20 to 20 kHz as an audible frequency band. The second period signal $V_{OSC2}$ can be a triangular wave or saw-tooth wave.

As far as the relationship between the first frequency $f_1$ and the second frequency $f_2$ is concerned, the first frequency $f_1$ is preferably integer multiples of the second frequency $f_2$, and more preferably $2^m$ multiples of (m is a natural number) the second frequency $f_2$. Thereby, by dividing or multiplying the frequency of one party, it is easy to generate the frequency of the other party. In this embodiment, it is assumed that the first frequency $f_1$=400 kHz, and the second frequency $f_2$=400/16=25 kHz.

The first pulse modulator 16 generates a first pulse signal S1 by comparing the signal corresponding to the error signal $V_{ERR}$ and the first period signal $V_{OSC1}$. In FIG. 1, the signal corresponding to the error signal $V_{ERR}$ is the error signal $V_{ERR}$ itself, but the signal obtained by performing other signal processing such as level shift or voltage division on the error signal $V_{ERR}$ can also be compared with the first period signal $V_{OSC1}$.

The pulse width (duty cycle) $\tau_1$ of the first pulse signal S1 is changed according to the error signal $V_{ERR}$. That is, the first pulse signal S1 is modulated by the pulse width. Moreover, the first pulse modulator 16 is configured to clamp the pulse width $\tau_1$ of the first pulse signal S1 at a predetermined first minimum pulse width $\tau_{MIN1}$.

Specifically, the first pulse modulator 16 includes a first comparator 18, a first minimum pulse width signal generating portion 20, and a first logic gate 22. The first comparator 18 compares the error signal $V_{ERR}$ and the first period signal $V_{OSC1}$ to generate a first intermediate pulse signal S1' being at a high level when $V_{ERR}>V_{OSC1}$. The more the error signal $V_{ERR}$ is reduced, the shorter the pulse width (duty cycle) of the first intermediate pulse signal S1' becomes.

The first minimum pulse width signal generating portion 20 generates a first minimum pulse width signal S3 having the first frequency $f_1$ and having a first minimum pulse width $\tau_{MIN1}$. The first logic gate 22 generates the first pulse signal S1 by performing logic synthesis, specifically logic sum, on the first intermediate pulse signal S1' and the first minimum pulse width signal S3. The pulse width $\tau_1$ of the first pulse signal S1 is clamped to the first minimum pulse width $\tau_{MIN1}$, and cannot be a value less than the first minimum pulse width $\tau_{MIN1}$.

The second pulse modulator 24 generates a second pulse signal S2 having a pulse width $\tau_2$ corresponding to the error signal $V_{ERR}$ by comparing the signal corresponding to the error signal $V_{ERR}$ and the second period signal $V_{OSC2}$. The second pulse modulator 24 includes a second comparator 26. The second comparator 26 compares the error signal $V_{ERR}$ and the second period signal $V_{OSC2}$ to generate the second pulse signal S2 being at a high level when $V_{ERR}>V_{OSC2}$. The more the error signal $V_{ERR}$ is reduced, the shorter the pulse width (duty cycle) $\tau_2$ of the second pulse signal S2 becomes. That is, the second pulse signal S2 is also modulated by the pulse width.

The first pulse modulator 16 shortens the pulse width $\tau_1$ of the first pulse signal S1 as the error signal $V_{ERR}$ is reduced. Moreover, if the error signal $V_{ERR}$ is smaller than the predetermined threshold level Vth, the pulse width $\tau_1$ is clamped at the first minimum pulse width $\tau_{MIN1}$. In another embodiment, the second pulse modulator 24, in a state that the pulse width of the first pulse signal S1 is clamped, shortens the pulse width of the second pulse signal S2 as the error signal $V_{ERR}$ is reduced.

To implement the modulation, the first oscillator 12 enables the first period signal $V_{OSC1}$ to change between a first lower limit level $V_{L1}$ and a first upper limit level $V_{H1}$ higher than the first lower limit level. In another embodiment, the second oscillator 14 enables the second period signal $V_{OSC2}$ to change between a second lower limit level $V_{L2}$ lower than the first lower limit level $V_{L1}$ and a second upper limit level $V_{H2}$ higher than the second lower limit level $V_{L2}$. The second lower limit level $V_{L2}$ is preferably higher than a lower limit value (such as 0.2 V) of the output voltage range of the gm amplifier 11.

The first pulse modulator 16 generates the first pulse signal S1 by comparing the error signal $V_{ERR}$ and the first period signal $V_{OSC1}$. Moreover, the second pulse modulator 24 generates the second pulse signal S2 by comparing the error signal $V_{ERR}$ and the second period signal $V_{OSC2}$.

The synthesis portion 30 synthesizes the first pulse signal S1 and the second pulse signal S2 to generate the driving pulse signal S5. Specifically, the second pulse signal S2 is used to mask the first pulse signal S1, thereby generating the driving pulse signal S5. Moreover, the synthesis portion 30 clamps the pulse width of the driving pulse signal S5 to a value not less than a predetermined second minimum pulse width $\tau_{MIN2}$.

The synthesis portion 30 includes a second logic gate 32, a third logic gate 34, and a second minimum pulse width signal generating portion 36. The second logic gate 32 is an AND gate, and generates a signal S5' corresponding to a logic product of the first pulse signal S1 and the second pulse signal S2. The second minimum pulse width signal generating portion 36 generates a second minimum pulse width signal S4 having the second frequency $f_2$ and having a second minimum pulse width $\tau_{MIN2}$. The third logic gate 34 limits the pulse width of the driving pulse signal S5 to be more than the second minimum pulse width $\tau_{MIN2}$ by taking a logic sum of two signals S5' and S4.

The driver 40 drives the switching transistor M1 according to the driving pulse signal S5. As a result, the duty cycle of ON/OFF of the switching transistor M1 is regulated in a manner that the feedback signal $V_{FB}$ and the reference voltage $V_{REF}$ are consistent, so that the output voltage $V_{OUT}$ is stabilized.

The structure of the switching power supply 2 including the control circuit 100 is described above. Next, operations thereof are illustrated.

Figure 2:
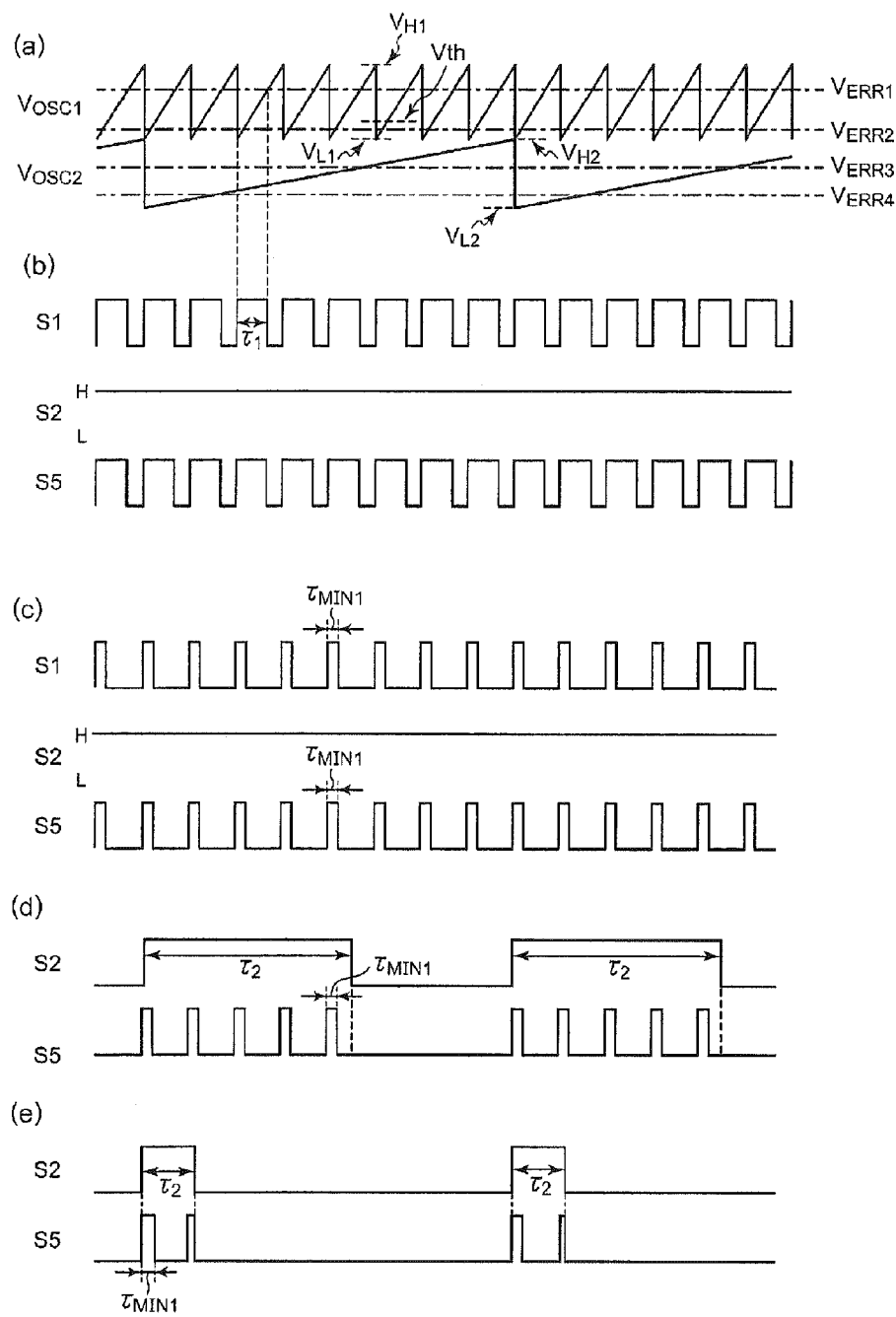
FIGS. 2(a) to 2(e) are time diagrams denoting operations of the switching power supply of FIG. 1.

FIGS. 2(a) to 2(e) are time diagrams denoting operations of the switching power supply 2 of FIG. 1. In FIG. 2(a), the first period signal $V_{OSC1}$, the second period signal $V_{OSC2}$ and the error signals $V_{ERR1\ to\ 4}$ at various levels are shown. FIGS. 2(b) to 2(e) denote wave forms of respective pulses of the error signals $V_{ERR1}$ to $V_{ERR4}$.

As shown in FIG. 2(b), when the error signal $V_{ERR}$ is relatively large ($V_{ERR1}$), the first pulse signal S1 has a pulse width $\tau_1$ corresponding to the error signal $V_{ERR}$. At this time, $V_{ERR1} > V_{OSC2}$, and therefore the second pulse signal S2 is maintained at a high level. As a result, the driving pulse signal S5 becomes a pulse signal the same as the first pulse signal S1.

As the error signal $V_{ERR}$ is reduced, the pulse width $\tau_1$ of the first pulse signal S1 is shortened; when the error signal $V_{ERR}$ is lower than a certain level, the pulse width $\tau_1$ of the first pulse signal S1 is clamped to the first minimum pulse width $\tau_{MIN1}$. As shown in FIG. 2(c), even if being relative to the error signal $V_{ERR2}$, the second pulse signal S2 is also maintained at a high level. The driving pulse signal S5 in this case becomes a pulse signal having the first minimum pulse width $\tau_{MIN1}$ and the frequency $f_1$.

Referring to FIG. 2(d), even if the error signal $V_{ERR}$ is further reduced ($V_{ERR3}$), the pulse width $\tau_1$ of the first pulse signal S1 is also fixed at the first minimum pulse width $\tau_{MIN1}$. Moreover, the pulse width of the second pulse signal S2 is determined according to the error signal $V_{ERR}$. That is, the number of pulses in the driving pulse signal S5 is changed according to the error signal $V_{ERR}$.

Referring to FIG. 2(e), when the error signal $V_{ERR}$ is further reduced ($V_{ERR4}$), the pulse width $\tau_2$ of the second pulse signal S2 is reduced. Moreover, the pulse width $\tau_1$ of the final pulse of each period of the driving pulse signal S5 is shortened as the pulse width $\tau_2$ of the second pulse signal S2 is reduced, and soon, the final pulse disappears. As the pulse width $\tau_2$ of the second pulse signal S2 is further shortened, the number of pulses of the driving pulse signal S5 in each high level duration of the second pulse signal S2 is reduced. Soon, each high level duration of the second pulse signal S2 only includes the foremost driving pulse signal S5 separately. Then, when the pulse width $\tau_2$ of the second pulse signal S2 is shorter than the first minimum pulse width $\tau_{MIN1}$, the pulse width of the driving pulse signal S5 is reduced, and is clamped after being reduced to the second minimum pulse width $\tau_{MIN1}$.

The operations of the switching power supply 2 are described above.

According to the switching power supply 2, when the load is heavy, operations are performed in a region where $V_{L1} < V_{ERR} < V_{H1}$, and therefore the duty cycle of the first pulse signal S1 is regulated, and the switching transistor M1 is driven with the first frequency $f_1$.

As the load is alleviated and the error signal $V_{ERR}$ is reduced, the duty cycle of the first pulse signal S1 is shortened. Soon, when $V_{ERR} < V_{th}$, the switching transistor M1 is switched with the first minimum pulse width $\tau_1$.

When the load is further alleviated, operations are performed in a range where $V_{L2} < V_{ERR} < V_{H2}$. As the load is alleviated, the pulse width $\tau_2$ of the second pulse signal S2 is shortened, and a portion of the first pulse signal S1 is masked, so that the effective ON time of the switching transistor M1 is reduced.

Finally, when the second pulse signal S2 becomes shorter, only the foremost pulse of the first pulse signal S1 is retained in the driving pulse signal S5, and the driving frequency of the switching transistor M1 is equal to the second frequency $f_2$. Moreover, the foremost pulse width of the driving pulse signal S5 is reduced to the second minimum pulse width $\tau_{MIN2}$, and in the light load state, the switching transistor M1 is switched intermittently with an extremely short pulse.

That is, in the switching power supply 2, in the light load state, the switching frequency of the switching transistor M1 is also only reduced to the second frequency $f_2$. That is, in the light load state, compared with the previous switching power supply operating in an intermittent mode (also called a pulse frequency modulating mode), frequency variation can be constrained.

If the second frequency $f_2$ is set to be higher than the audible frequency band, generation of the acoustic noise can also be constrained.

The basic structure, the operation and the effect of the switching power supply 2 are described above. Next, a variation or specific structure example thereof is illustrated.

In the switching power supply 2 of FIG. 1, a dead band exists where even if the error signal $V_{ERR}$ is changed, the effective ON time of the driving pulse signal S5 is not changed, and as far as the system stability is concerned, existence of the dead band is undesirable. For example, as a phenomenon caused by the dead band, a case exists as follows: in the light load state, the pulse width of the second pulse signal S2 fluctuates, and the number of first pulse signals S1 in one period of the second pulse signal S2 fluctuates.

For example, FIG. 2(a) denotes a case that the first lower limit level $V_{L1}$ and the second upper limit level $V_{H2}$ are approximately equal, but in the case, the dead band where even if the error signal $V_{ERR}$ is changed, the driving pulse signal S5 is not changed is generated in a range where $V_{H2} < V_{ERR} < V_{th}$. In order to prevent the case, it can be set that $V_{H2} > V_{L1}$, and furthermore it can be set that $V_{H2} \approx V_{th}$. Thereby, when the error signal $V_{ERR}$ is reduced and the pulse width of the first pulse signal S1 is clamped, the pulse width of the second pulse signal S2 becomes shorter immediately, so the dead band can be eliminated.

Moreover, it should be noted that, a dead band also exists in a range where $V_{L2} < V_{ERR} < V_{H2}$. That is, the trailing edge (negative edge) of the second pulse signal S2 is changed in an interval where the first pulse signal S1 is at a low level, the change of the error signal $V_{ERR}$ is not presented as the change of the driving pulse signal S5. The problem can be solved by designing the wave form of the second period signal $V_{OSC2}$.

Figure 3:
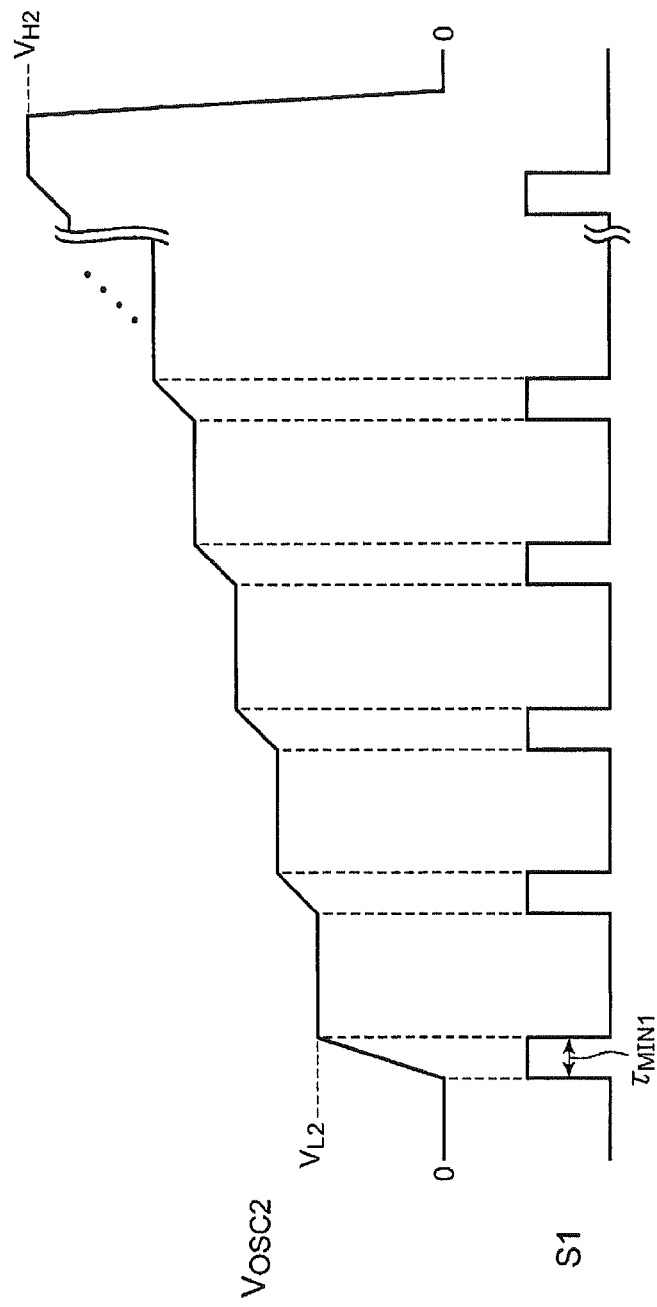
FIG. 3 is an oscillogram of a second period signal used to eliminate a dead band.

FIG. 3 is an oscillogram of a second period signal $V_{OSC2}$ used to eliminate a dead band. The second oscillator 14 generates the second period signal $V_{OSC2}$ in a manner of being sloped in an interval where the first pulse signal S1 is of the first minimum pulse width $\tau_{MIN1}$ at a high level and being planar in intervals other than this interval. Thereby, the dead band can be eliminated.

Figure 4:
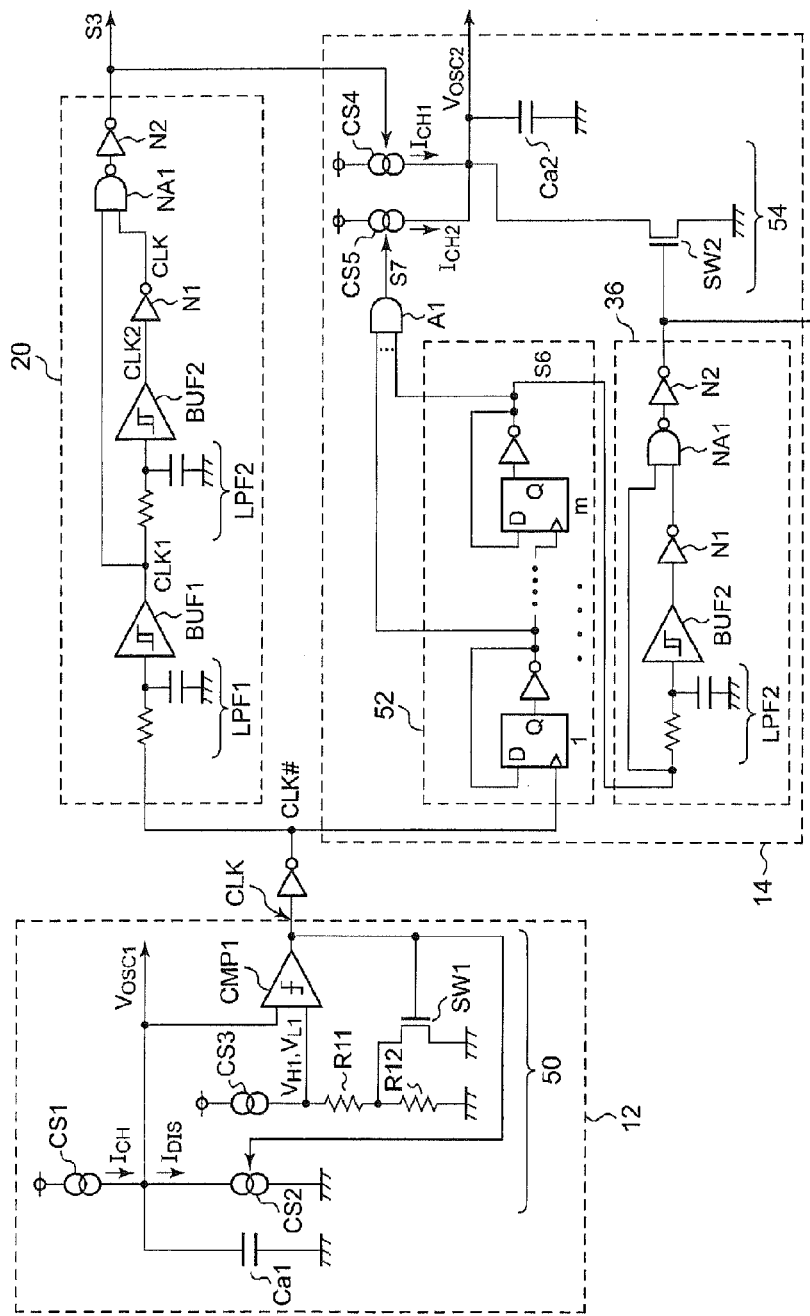
FIG. 4 is a circuit diagram denoting a part of a specific structure example of a control circuit.

FIG. 4 is a circuit diagram denoting a part of a specific structure example of a control circuit 100. FIG. 4 shows a first oscillator 12, a second oscillator 14, a first minimum pulse width signal generating portion 20, and a second minimum pulse width signal generating portion 36 in the control circuit 100.

The first oscillator 12 includes a first capacitor Ca1, and a first charging/discharging circuit 50. One end of the first capacitor Ca1 is grounded. The first charging/discharging circuit 50 begins discharging when the voltage $V_1$ of the first capacitor Ca1 reaches the first upper limit level $V_{H1}$, and begins charging when the voltage $V_1$ of the first capacitor Ca1 reaches the first lower limit level $V_{L1}$. The first oscillator 12 outputs the voltage $V_1$ of the first capacitor Ca1 as the first period signal $V_{OSC1}$.

The first charging/discharging circuit 50 includes current sources CS1, CS2, and CS3, a comparator CMP1, resistors R11 and R12, and a switch SW1. The current source CS1 supplies the charging current $I_{CH}$ to the first capacitor Ca1. The current source CS2 is configured to be switched between ON and OFF states, and in the ON state, the first capacitor Ca1 discharges at the discharging current $I_{DIS}$.

The current source CS3, the resistors R11 and R12 and the switch SW1 are configured to generate the voltage sources of the voltages $V_{L1}$ and $V_{H1}$. The current source CS3 generates a reference current $I_{REF}$. In the ON state of the switch SW1, the first lower limit level $V_{L1}=I_{REF}\times R11$ is generated. In the OFF state of the switch SW1, the first upper limit level $V_{H1}=I_{REF}\times(R11+R12)$ is generated. The comparator CMP1 compares the voltage of the first capacitor Ca1 and the reference voltage $V_{L1}/V_{H1}$, switches ON/OFF of the switch SW1 according to a comparison result, and switches ON/OFF of the current source CS2.

The first period signal $V_{OSC1}$ of a saw-tooth wave with the wave crest being $V_{H1}$ and the wave trough being $V_{L1}$ is generated through the first oscillator 12.

The output signal (synchronization clock) CLK of the comparator CMP1 enables the level to be converted according to the switching between the charging state and the discharging state of the charging/discharging circuit (CS1, CS2). The synchronization clock CLK is inverted by the inverter N3, and the inverted synchronization clock CLK is output to the first minimum pulse width signal generating portion 20 and the first charging/discharging circuit 50.

The first minimum pulse width signal generating portion 20 includes low-pass filters LPF1 and LPF2, a buffer BUF1, inverters N1 and N2, and a NAND gate NA1. The low-pass filter LPF1 filters the input synchronization clock CLK# (# denotes that the logic is inverted). The buffer BUF1 is a hystersis buffer (schmitt buffer) receiving the output of the low-pass filter LPF1. The low-pass filter LPF1 and the buffer BUF1 delay the synchronization clock CLK1 by the first minimum pulse width $\tau_{MIN1}$, and generate the synchronization clock CLK1.

Moreover, the low-pass filter LPF2 and the buffer BUF2 delay the synchronization clock CLK, thereby generating the synchronization clock CLK2. By taking the logic product of the synchronization clock CLK1 and the inverted signal CLK2# of the synchronization clock CLK2, the first minimum pulse width signal S3 having the first minimum pulse width $\tau_{MIN1}$ is generated.

The second oscillator 14 includes a second capacitor Ca2, a frequency divider 52, and a second charging/discharging circuit 54. The frequency divider 52 divides the frequency of the synchronization clock CLK#. The frequency divider 52 includes m sections of ½ frequency dividers. In a case that 4 sections of frequency dividers are disposed, 1/16 frequency dividing is performed on the synchronization clock CLK#. That is, a pulse signal S6 having the second frequency $f_2$ is output from the frequency divider 52.

The second charging/discharging circuit 54 includes current sources CS4 and CS5 and a discharging switch SW2.

In the frequency divider 52, m signals subject to frequency dividing generated at each stage pass through the AND gate A1. From the AND gate A1, generated is a pulse signal S7 in the pulse of the synchronization clock CLK# which is asserted once (at a high level) among 16 times. The pulse signal S7 has the second frequency $f_2$ and the pulse width equal to the pulse width of the synchronization clock CLK. If the pulse signal S7 is asserted, the current source CS5 is switched on, and the second capacitor Ca2 is charged. By use of the charging performed by the current source CS5, the second period signal $V_{OSC2}$ is sharply increased from 0 V to the second lower limit level $V_{L2}$. The first lower limit level $V_{L2}$ is specified according to the charging current $I_{CH2}$ from the current source CS5.

$$V_{L2}=\tau_{MIN1}\times I_{CH2}/Ca2$$

Next, whenever the first minimum pulse width signal S3 is asserted (at a high level), the current source CS4 is switched on, the charging current $I_{CH1}$ is supplied to the second capacitor Ca2, and the second capacitor Ca2 is charged. The current value of the charging current $I_{CH1}$ specifies the gradient of a slope following the second slope of the second period signal $V_{OSC2}$ of FIG. 3.

The second minimum pulse width signal generating portion 36 and the first minimum pulse width signal generating portion 20 are of the same structure. The second minimum pulse width signal generating portion 36 receives the pulse signal S6 of the second frequency $f_2$, and generates the second minimum pulse width signal S4 having the second minimum pulse width $\tau_2$. The discharging switch SW2 is switched on whenever the second minimum pulse width signal S4 is asserted, so that the charge of the second capacitor Ca2 discharges.

According to the second oscillator 14 of FIG. 4, as shown in FIG. 3, in the ON interval of the first minimum pulse width signal S3, the second period signal $V_{OSC2}$ having a slope can be generated.

Persons skilled in the art should understand that, the embodiment is exemplary, various variations can exist in a combination of structure elements or processing programs, and the variations also fall within the scope of the present invention.

The boost switching power supply is illustrated in the embodiment, but the present invention can also be applicable to the buck or buck-boost switching power supply. Moreover, the present invention can be applicable to an insulating switching power supply having a transformer in place of the inductor L1.

In the embodiment, illustrated is a case that the pulse width of the driving pulse signal S5 is clamped to the predetermined second minimum pulse width $\tau_{MIN2}$ by using the second minimum pulse width signal S4. From the perspective of reducing the audible acoustic noise, it is favorable to clamp the pulse width of the driving pulse signal S5 to the second minimum pulse width $\tau_{MIN2}$. In another embodiment, sometimes even if the clamping is not performed, the acoustic noise is still not sensed. In the case, the second minimum pulse width signal generating portion 36 and the third logic gate 34 can be omitted, so the circuit area can be reduced.

Moreover, in the embodiment, the switching power supply in the voltage mode is illustrated, the present invention can further be applicable to a switching power supply in another mode such as a wave crest current mode or average current mode. In the case, persons skilled in the art should understand that, the structures of the first pulse modulator 16 and the second pulse modulator 24 can be modified according to the feedback manner.

(First Variation)

Figure 5:
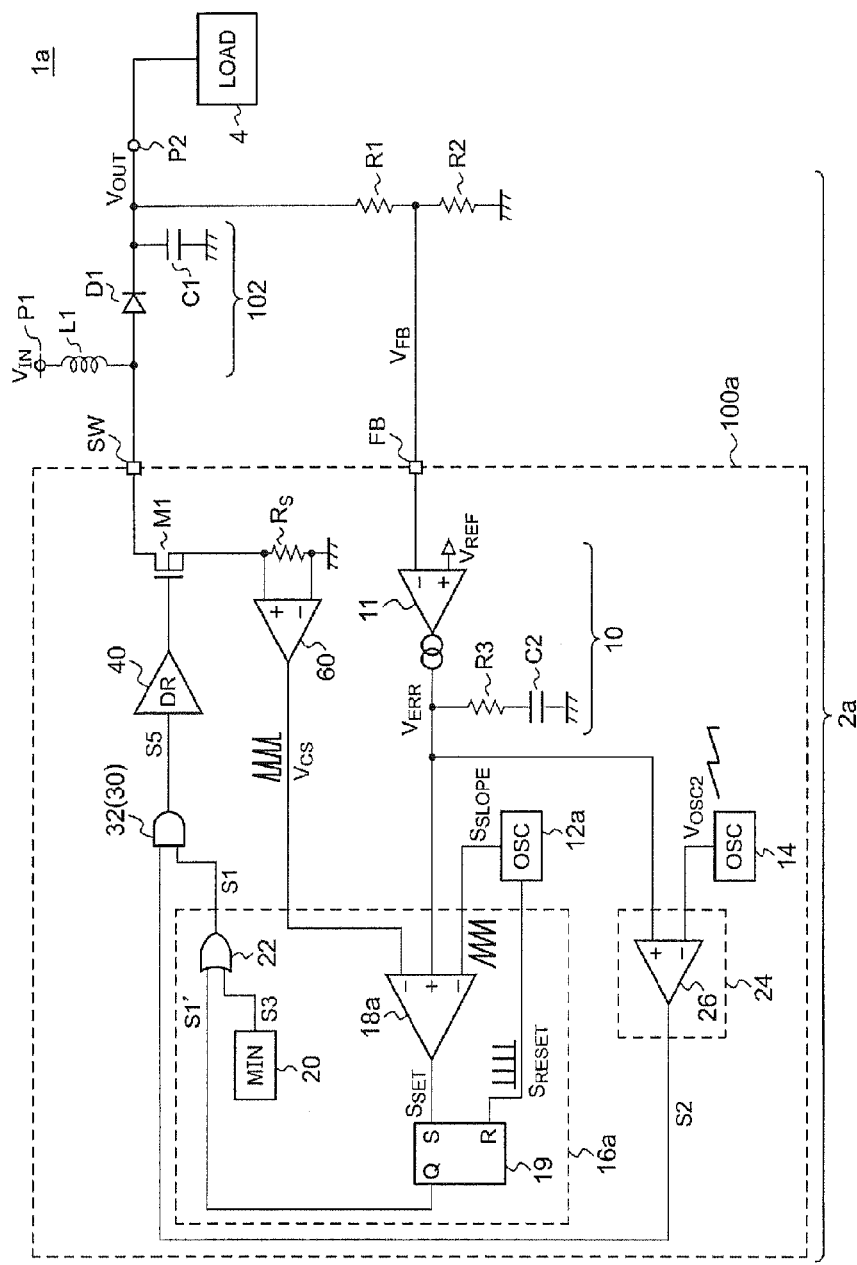
FIG. 5 is a circuit diagram denoting a structure of a switching power supply of a first variation.

FIG. 5 is a circuit diagram denoting a structure of a switching power supply 2a of a first variation. The switching power supply 2a includes a control circuit 100a in a wave crest current mode.

A detection resistor Rs is disposed between the source of the switching transistor M1 and the grounded terminal. An amplifier 60 generates a current detection signal $V_{CS}$ corresponding to the current flowing through the inductor L1 by amplifying the voltage drop of the detection resistor Rs. Furthermore, the method for generating the current detection signal $V_{CS}$ is not limited thereto.

A first oscillator 12a generates a reset pulse $S_{RESET}$ having the first frequency $f_1$ and a slope signal $V_{SLOPE}$ used for phase compensation.

The first pulse modulator 16a generates the first pulse signal S1 having the first frequency $f_1$ and having the pulse width corresponding to the error signal $V_{ERR}$ according to the reset pulse $S_{RESET}$ and the slope signal $V_{SLOPE}$ used for phase compensation, and clamps the pulse width of the first pulse signal S1 to a predetermined first minimum pulse width $\tau_{MIN1}$.

The first comparator 18a compares the signal generated by overlapping the slope signal $V_{SLOPE}$ on the current detection signal $V_{CS}$ and the error signal $V_{ERR}$, and generates the set pulse $S_{SET}$ corresponding to the comparison result.

The set pulse $S_{SET}$ is input to the set terminal of the SR trigger 19, the reset pulse $S_{RESET}$ from the first oscillator 12a is input to the reset terminal, and a pulse signal S1' modulated through the pulse width is output from the output terminal of the SR trigger 19.

According to the switching power supply 2a of FIG. 5, the effect the same as that of the switching power supply 2 of FIG. 1 can be obtained.

Persons skilled in the art can understand that, the present invention can further be applicable to a switching regulator in an average current mode, or in a fixed ON time or fixed OFF time mode.

Furthermore, the second minimum pulse width signal generating portion 36 and the third logic gate 34 can also be added to the control circuit 100a of FIG. 5, and the pulse width of the driving pulse signal S5 is limited to the second minimum pulse width $\tau_{MIN2}$.

Figure 6:
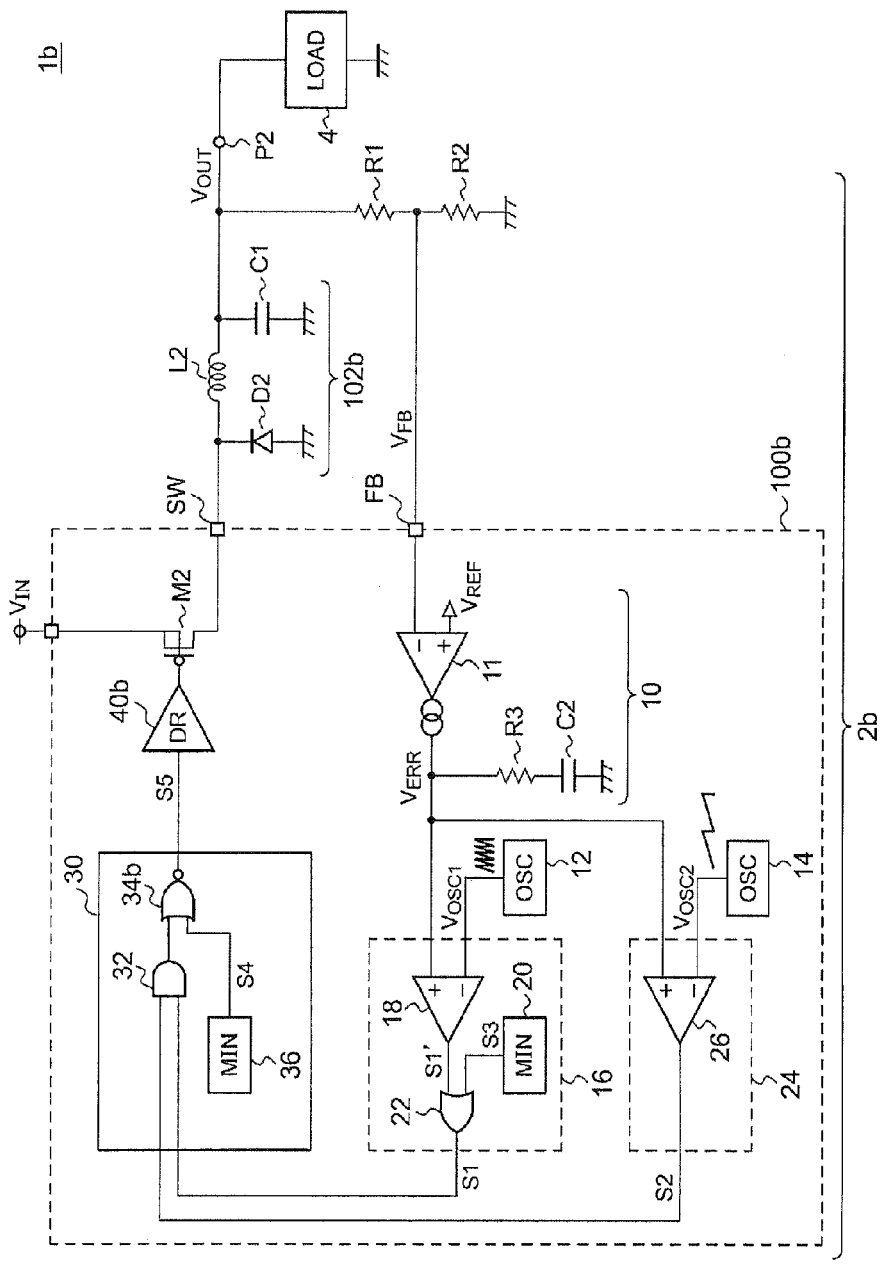
FIG. 6 is a circuit diagram denoting a structure of a switching power supply of a second variation.

FIG. 6 is a circuit diagram denoting a structure of a switching power supply 2b of a second variation. The switching power supply 2b is a buck switching regulator, and the control circuit 100b is of a structure in a voltage mode the same as that in FIG. 1. An output circuit 102b includes an inductor L2, a rectifying diode D2, and an output capacitor C1, and has a topology of a buck switching regulator. Furthermore, a synchronization rectifying transistor can further be used in place of the rectifying diode D2.

The switching transistor M2 is driven by the driver 40. The third logic gate 34 in FIG. 1 is replaced with a NOR gate 34b in FIG. 6.

In FIG. 6, definitely, the third logic gate 34b and the second minimum pulse width signal generating portion 36 can also be omitted. In the case that the third logic gate 34b is omitted, an inverter can be inserted instead (an inverter 34c in FIG. 7).

Figure 7:
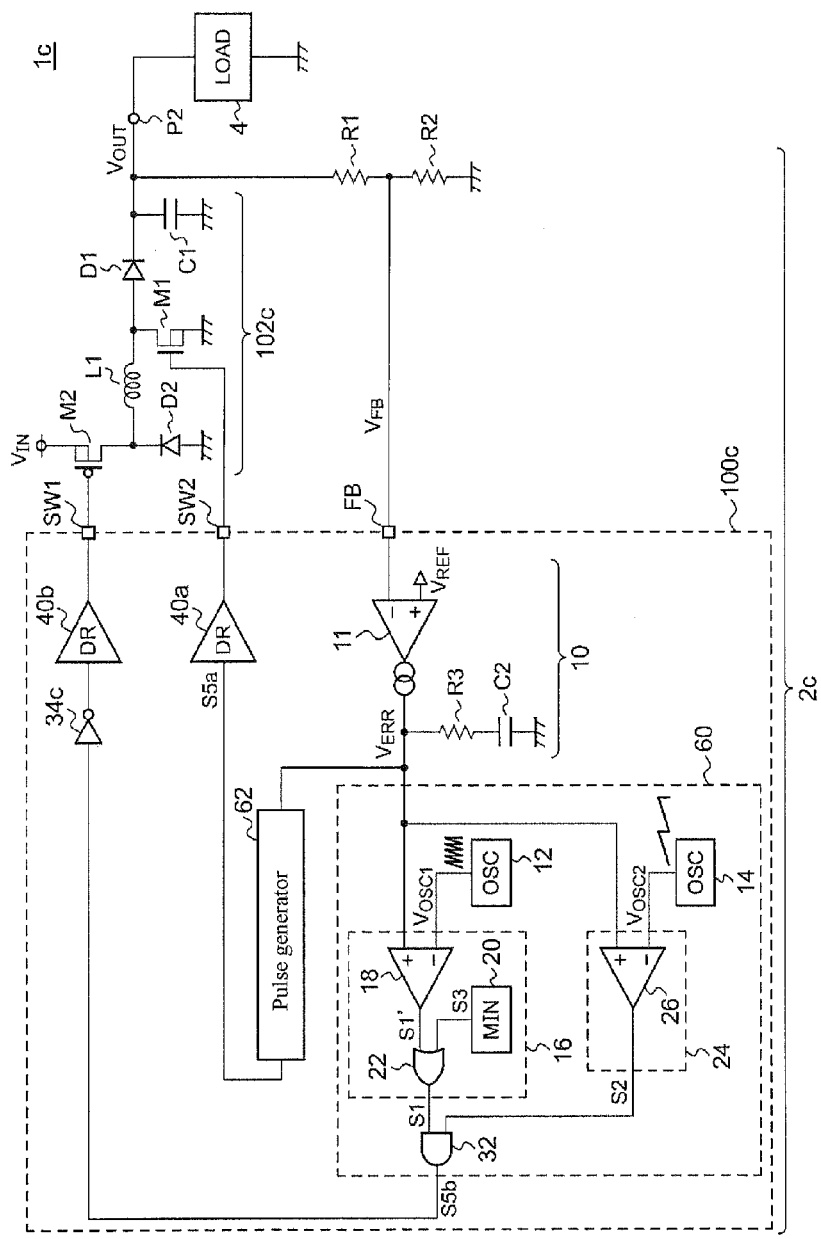
FIG. 7 is a circuit diagram denoting a structure of a switching power supply of a third variation.

FIG. 7 is a circuit diagram denoting a structure of a switching power supply 2c of a third variation. The switching power supply 2c is a boost switching regulator, and the control circuit 100c is of a structure in a voltage mode the same as those in FIG. 1 and FIG. 6.

The output circuit 102c has a topology of a buck-boost switching regulator. The switching transistors M1 and M2 can be disposed in the control circuit 100c.

The driving pulse signal S5b used to drive the switching transistor M2 is generated by the pulse generator 60. The driving pulse signal S5a used to drive the switching transistor M1 is generated by the pulse generator 62. The structures of the pulse generators 60 and 62 are the same as the structure shown in FIG. 1 or FIG. 6.

In FIG. 7, the second minimum pulse width signal generating portion 36 and the third logic gate 34 can be added onto respective paths of the driving pulse signals S5a and S5b so as to limit the pulse width.

Persons skilled in the art should understand that, in the buck or buck-boost switching regulator shown in FIG. 6 or FIG. 7, the present invention can also be applicable to a structure in the wave crest current mode shown in FIG. 5, in the average current mode, or in the fixed ON time (OFF time) mode.

In this embodiment, the relationship between logic values of a high level and a low level of a signal, and the magnitude of a voltage signal is taken as an example, which can be appropriately inverted by an inverter so as to be freely altered.

Second Embodiment

Next, a switching power supply according to the second embodiment is illustrated. The switching power supply according to the second embodiment is the invention with the objective of improving the efficiency of the switching power supply in a light load and in a heavy load, and can be used in combination with the first embodiment or in combination with other technologies.

Figure 8:
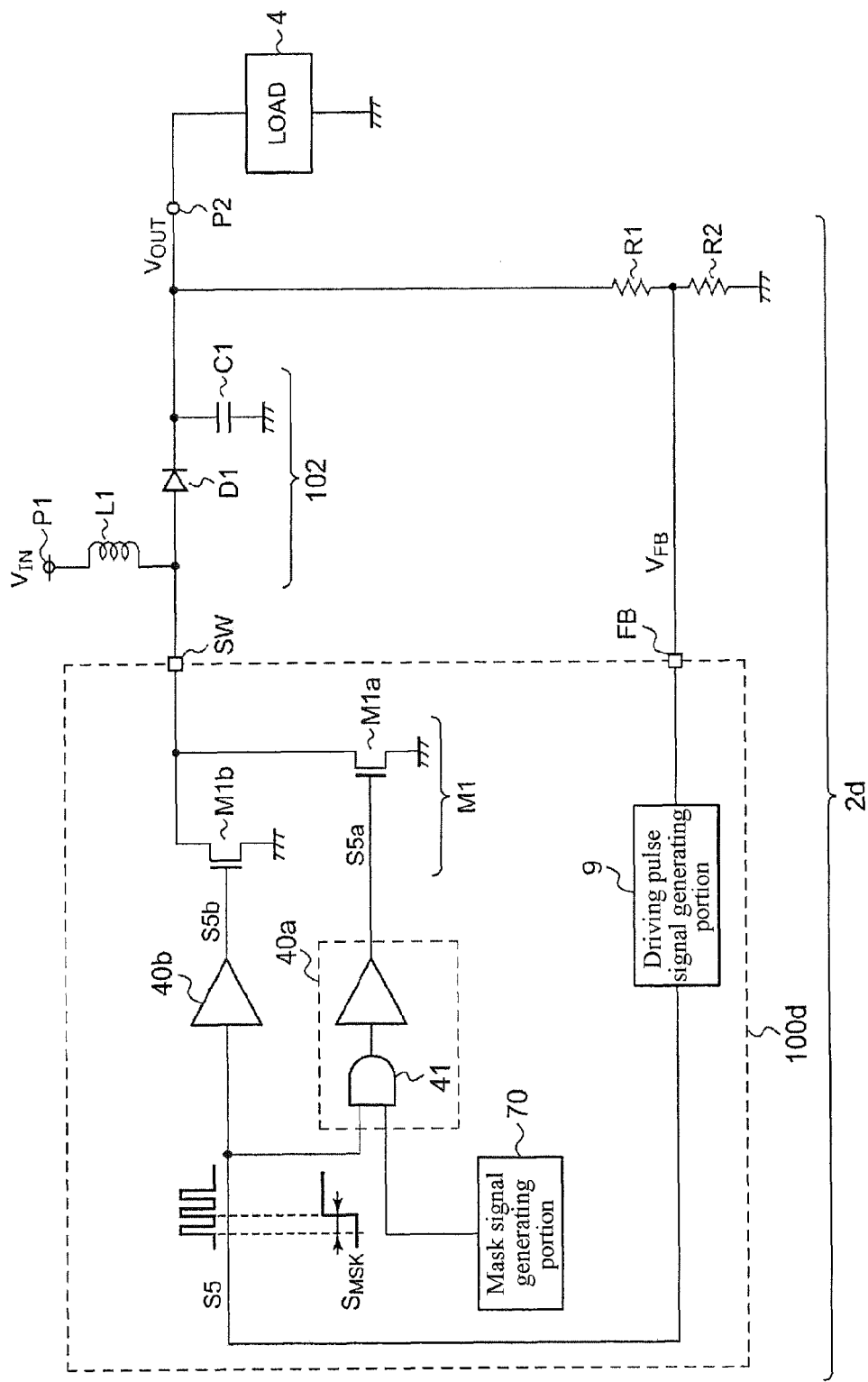
FIG. 8 is a circuit diagram denoting a structure of a switching power supply according to a second embodiment.

FIG. 8 is a circuit diagram denoting a structure of a switching power supply 2d according to a second embodiment.

In the switching power supply 2d, the switching element M1 is partitioned into a first the switching transistor M1a and a second the switching transistor M1b disposed side by side. Moreover, control terminals (gates) of the first switching transistor M1a and the second switching transistor M1b can be independently and separately switched.

As described below, the first switching transistor M1a is mainly used in the heavy load, so the size thereof is designed so large that the loss of the switching power supply 2d is reduced in the heavy load. In another embodiment, the second switching transistor M1b is mainly used in the light load, so the size thereof is designed smaller than the size of the first switching transistor M1a so that the gate driving current is reduced.

In this embodiment, the first switching transistor M1a and the second switching transistor M1b are disposed in the control circuit 100d, but they can also be disposed out of the control circuit 100d.

The control circuit 100d is configured to operate in an intermittent mode (in a light load mode) in the light load state, and the intermittent mode repeats a driving duration $T_{DRV}$ enabling the switching element M1 to be switched and a stop duration $T_{STOP}$ stopping the switching element from being switched. Moreover, the control circuit 100d is configured to operate in a continuous mode in the heavy load, and the continuous mode continuously switches the switching element M1 at a predetermined frequency.

The control circuit 100d, besides the first switching transistor M1a and the second switching transistor M1b, further includes a pulse signal generating portion 9, a synthesis portion 30, a first driver 40a, a second driver 40b, and a mask signal generating portion 70.

The pulse signal generating portion 9 generates a driving pulse signal S5 at least including a pulse in the driving duration $T_{DRV}$. The number of pulse in the driving pulse signal S5 in the driving duration $T_{DRV}$ is controlled as follows: the lighter the load is, the less the number is.

The first driver 40a neglects predetermined K (K is a natural number) pulses of the at least one pulse in the driving pulse signal S5, while drives the first switching transistor M1a according to pulses other than the K pulses. In another embodiment, the second driver 40b drives the second switching transistor M1b according to the at least K pulses in the driving pulse signal S5. In this embodiment, the case of K=1 is illustrated, but K can be any number.

As described, the number of pulses in the driving pulse signal S5 is changed according to the load. The K pulses neglected by the first driver 40a are in the driving pulse signal S5 when the number of pulses is reduced to K according to the load.

The mask signal generating portion 70 generates a mask signal $S_{MSK}$ at a predetermined level (in this embodiment, at a low level) in the mask duration $T_{MSK}$ including a duration generating K pulses.

The first driver 40a stops driving the first switching transistor M1a in the mask duration $T_{MSK}$ in which the mask signal $S_{MSK}$ is at a low level, and drives the first switching transistor M1a according to the driving pulse signal S5 in a duration other than this duration. For example, the first driver 40a includes an AND gate 41 for generating a logic product of the driving pulse signal S5 and the mask signal $S_{MSK}$, and drives the first switching transistor M1a according to the output of the AND gate 41.

Thereby, the first driver 40a does not drive the first switching transistor M1a by use of the K pulses in the driving pulse signal S5 but can use the remaining pulses to drive the first switching transistor M1a.

The first driver 40a preferably drives the first switching transistor M1a according to all pulses in the driving pulse signal S5 in the heavy load state of operating in a continuous mode. Therefore, the mask signal generating portion 70 fixes the mask signal $S_{MSK}$ at a high level in the heavy load state.

In this embodiment, the second driver 40b drives the second switching transistor M1b not only according to K pulses, but also according to all other pulses. In the case, the second driver 40b receives the driving pulse signal S5, and drives the second switching transistor M1b according to, the driving pulse signal S5.

In a variation, the second driver 40b drives the second switching transistor M1b only by use of K pulses. In the variation, the second driver 40b drives a second switching transistor M2b according to the driving pulse signal S5 in the mask duration $T_{MSK}$ in which the mask signal $S_{MSK}$ is at a low level, and stop driving the second driver 40b in a duration other than this duration. The second driver 40b can be disposed with a logic gate as the first driver 40a is disposed with a logic gate.

The structure of the control circuit 100d is described above.

Figure 9:
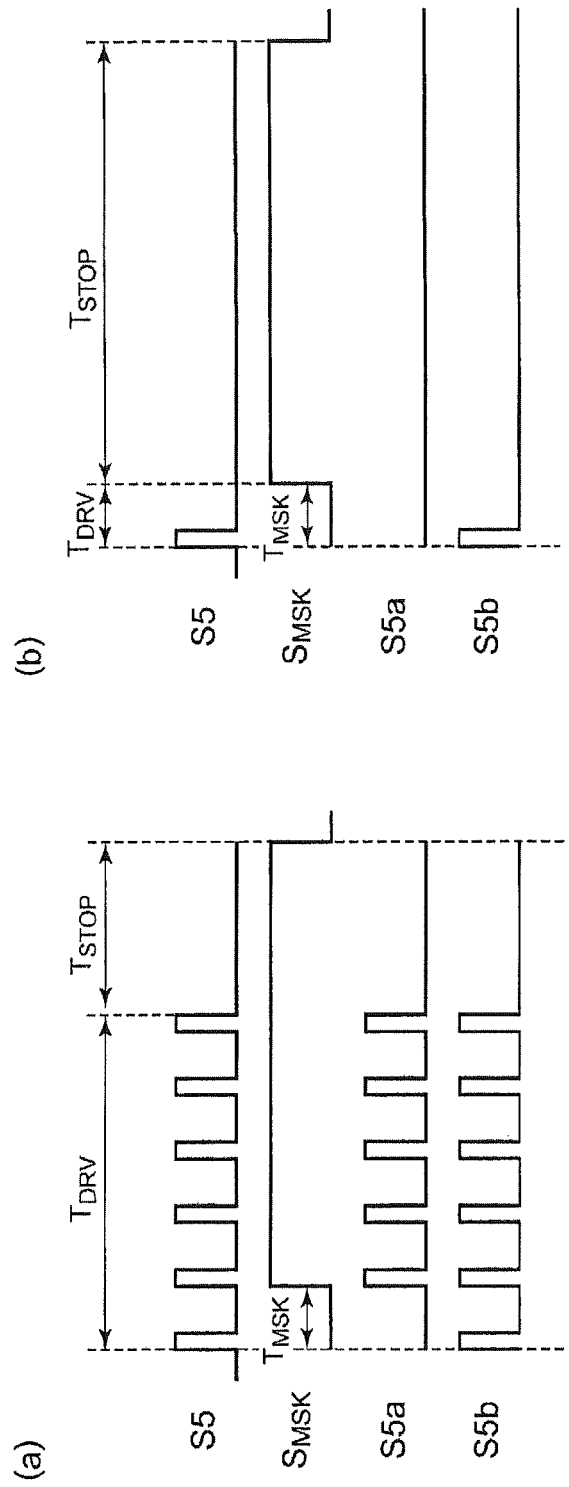
FIGS. 9(a) and 9(b) are oscillograms denoting operations of the switching power supply of FIG. 8.

Next, operations of the control circuit 100d are illustrated. FIGS. 9(a) and 9(b) are oscillograms denoting operations of the switching power supply 2d of FIG. 8.

In FIG. 9(a), the number of pulses in the driving pulse signal S5 in the driving duration $T_{DRV}$ is more than K (=1). The mask signal $S_{MSK}$ is generated in a manner of being at a low level in the mask duration $T_{MSK}$ including the foremost K=1 pulse. The first driver 40a neglects pulses of the driving pulse signal S5 in the mask duration $T_{MSK}$. Therefore, pulses following the second pulse are provided to the gate of the first switching transistor M1a. In another embodiment, the second driver 40b directly provides the driving pulse signal S5 to the gate of the second switching transistor M1b.

Thereby, the remaining pulses generated in the mask duration $T_{MSK}$ other than K pulses are used to drive the first switching transistor M1a and the second switching transistor M1b. Therefore, the ON-state resistance of the switching element M1 is reduced, and the switching power supply 2d is characterized by low loss and high efficiency.

Next, referring to FIG. 9(b), when the load is further alleviated compared with that in FIG. 9(a), the number of pulses in the driving pulse signal S5 in the driving duration $\tau_{DRV}$ is reduced. When the number of pulses is reduced to be less than K, the switching of the first switching transistor M1a is completely stopped, and only the second switching transistor M1b is switched.

Thereby, in the light load, it is not required to aim to the gate driving current of the first switching transistor M1a with a large size, and only the second switching transistor M1b with a small gate capacitance is switched, so that the gate driving current can be reduced and the efficiency is increased.

As described, in the switching power supply 2d, when the number of pulses in the driving pulse signal S5 is reduced to be less than K, the switching of the first switching transistor M1a is stopped. In other words, the level of the load current enabling the driving of the first switching transistor M1a to be stopped can be selected according to the parameter K.

The basic structure of the switching power supply 2d according to the second embodiment is described above.

The structure of the pulse signal generating portion 9 is not specially limited, any modulator can be used, and the switching power supply 2d can be appropriately combined with the control circuit 100 according to the first embodiment. The combination of the switching power supply 2d and the first embodiment is illustrated below.

Figure 10:
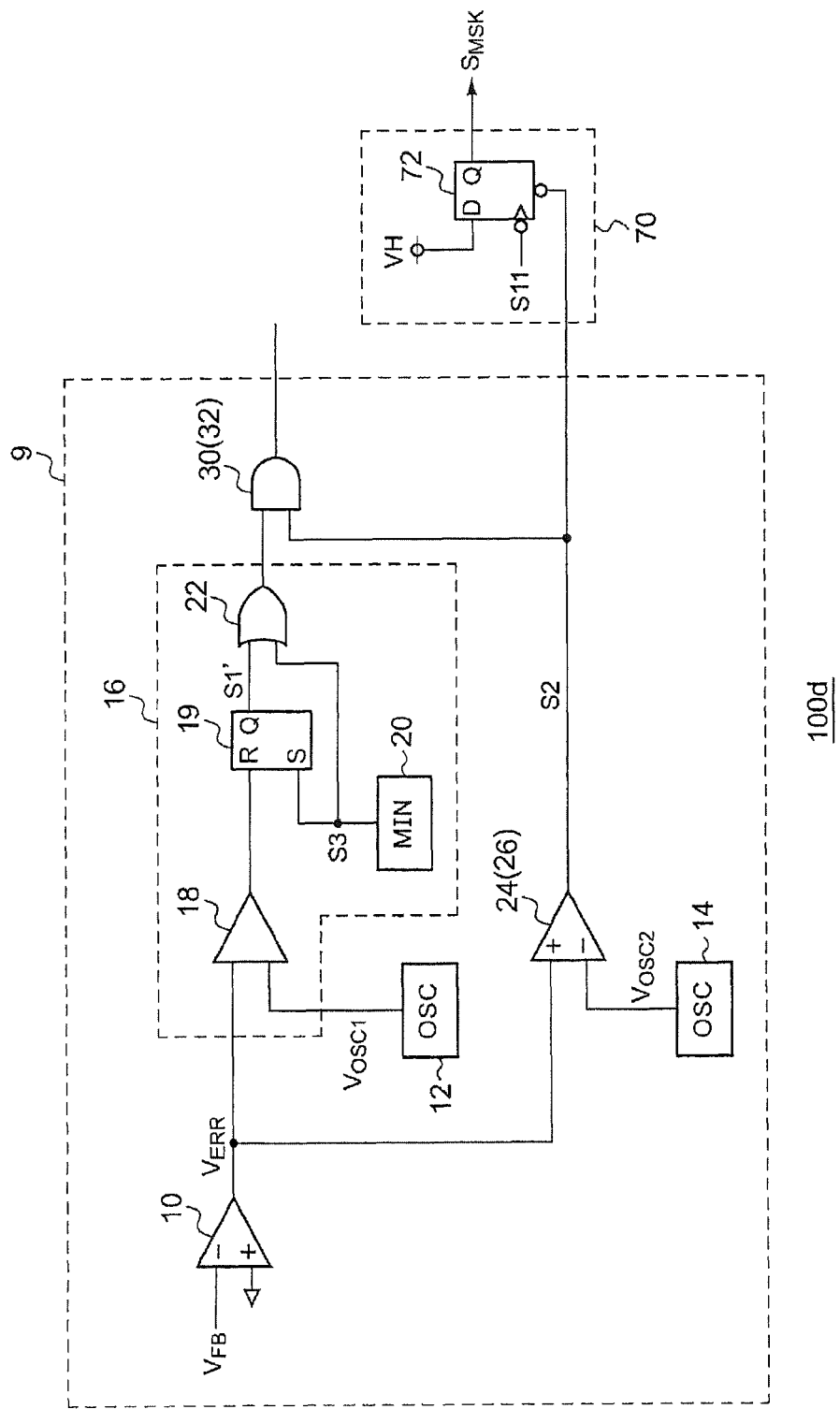
FIG. 10 is a circuit diagram denoting a structure example of a pulse signal generating portion of a switching power supply.

FIG. 10 is a circuit diagram denoting a structure example of a pulse signal generating portion 9 of a switching power supply 2d.

The pulse signal generating portion 9 includes an error amplifier 10, a first pulse modulator 16, a second pulse modulator 24, and a synthesis portion 30. The basic structure operation of each block of the pulse signal generating portion 9 are the same as what are illustrated in the first embodiment.

The first pulse modulator 16 in FIG. 10, besides the first pulse modulator 16 in FIG. 1, further includes an SR trigger 19. The output of the first comparator 18 is input to the reset terminal of the SR trigger 19, and the first minimum pulse width signal S3 is input to the set terminal thereof. By disposing the SR trigger 19, the output of the first comparator 18 and the first minimum pulse width signal S3 are synchronized. Thereby, the minimum pulse width of the first pulse signal S1 output from the first logic gate 22 can be made consistent with the pulse width of the first minimum pulse width signal S3 accurately.

The mask signal generating portion 70 includes a trigger 72. A high level voltage VH is input to the input terminal (D) of the trigger 72. Moreover, a pulse signal S11 denoting the trailing edge of the mask duration $T_{MSK}$ is input to the clock terminal (negative logic) of the trigger 72, and the second pulse signal S2 is input to the reset terminal 8 (negative logic) thereof.

Figure 11:
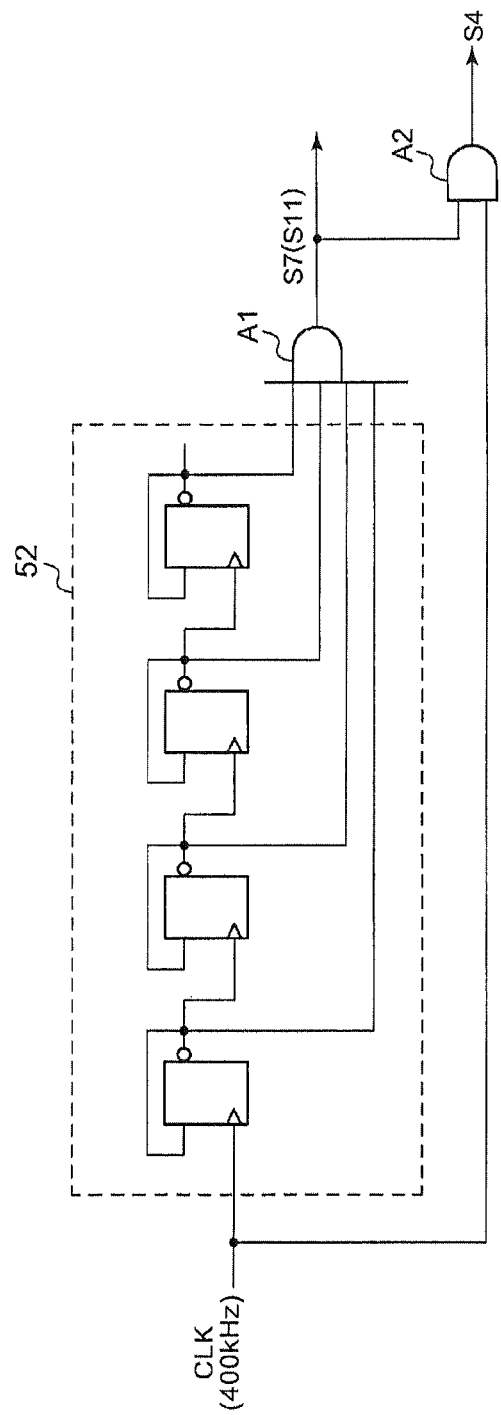
FIG. 11 is a circuit diagram denoting a structure example of a second oscillator of a pulse signal generating portion.

FIG. 11 is a circuit diagram denoting a structure example of a second oscillator of a pulse signal generating portion 9.

Here, it is assumed that the first frequency $f_1$=400 kHz, and the second frequency $f_2$=25 kHz, and K=1.

A clock signal CLK of 400 kHz is generated by the first oscillator 12 in FIG. 4. 1/16 frequency dividing is performed on the clock signal CLK by the frequency divider 52. The AND gate A1 generates the pulse signal S7 of a logic product of outputs of stages of a trigger of the frequency divider 52. The pulse signal S7 is equivalent to the pulse signal S11 in FIG. 10.

The AND gate A2 is another structure example of the second minimum pulse width signal generating portion 36 in FIG. 4. The logic product of the output S7 of the AND gate A1 and the clock signal CLK, that is, the second minimum pulse width signal S4, is generated. The second minimum pulse width signal generating portion 36 in FIG. 4 can be also disposed in place of the AND gate A2, so that another structure is set. Otherwise, in the first embodiment, the AND gate A2 can also be used in place of the second minimum pulse width signal generating portion 36.

Figure 12:
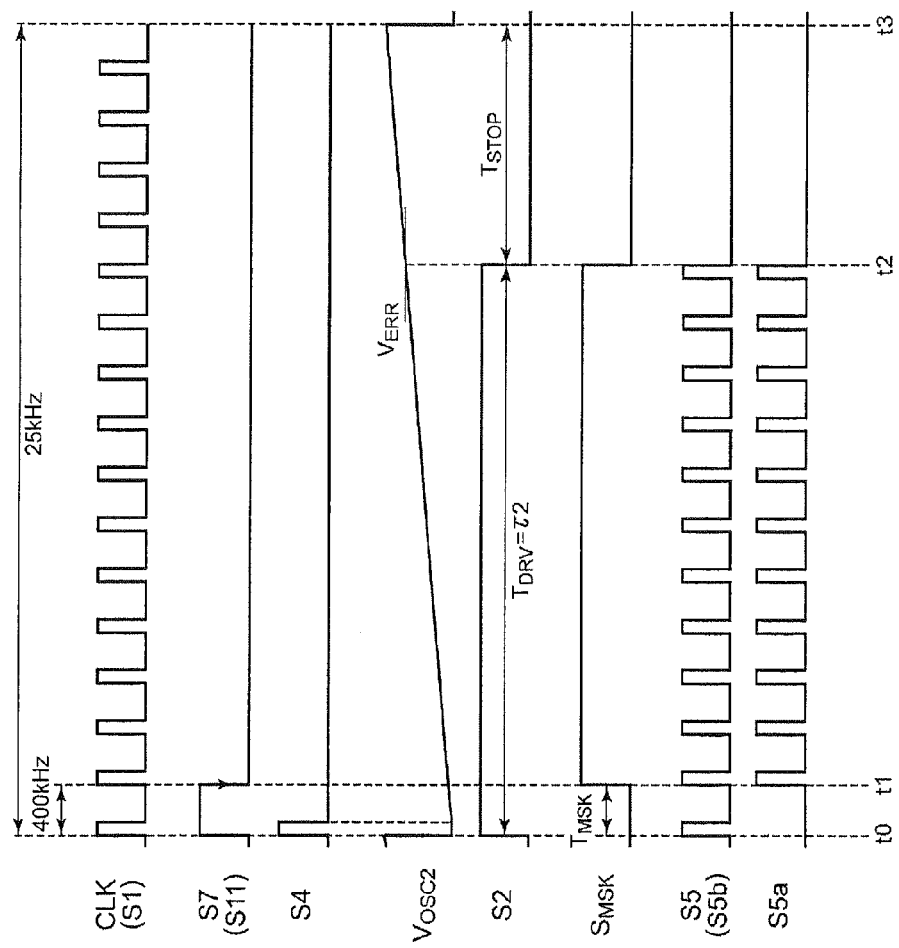
FIG. 12 is an oscillogram denoting operations of the pulse signal generating portion of FIG. 10.

FIG. 12 is an oscillogram denoting operations of the pulse signal generating portion 9 of FIG. 10. The second period signal $V_{OSC2}$ denotes a monotonous slope, and can also be of a wave form ascending at stages as shown in FIG. 3. The second pulse signal S2 is corresponding to the driving duration $T_{DRV}$ in the duration τ2 at a high level, and the second pulse signal S2 is corresponding to the stop duration $T_{STOP}$ in a duration at a low level.

According to the level of the error signal $V_{ERR}$, the pulse width of the second pulse signal S2 is changed, and the number of pulses of the driving pulse signal S5 in the driving duration $T_{DRV}$ is changed. Moreover, as the load becomes lighter, the pulses in the driving pulse signal S5 are masked by the second pulse signal S2 subsequently. That is, the pulses remaining when the number of pulses is reduced to K are the foremost K pulses on a time axis.

At the beginning time t0 in a period of 25 kHz, the mask signal $S_{MSK}$ is at a low level. The reason is that, the negative edge of the second pulse signal S2 in a previous period is used to reset the trigger 72. Next, at the time t1, the negative edge of the pulse signal S11 is used to convert the mask signal $S_{MSK}$ to a high level. The duration from the time t0 to the time t1 becomes the mask duration $T_{MSK}$. The pulse signal S11 is generated according to the structure in FIG. 11, and the mask duration $T_{MSK}$ can be generated in a manner of including the foremost K=1 pulse in the period of 25 kHz. Furthermore, it should be understood that, in the case that K is set to a value other than 1, signals input to the AND gate A1 in FIG. 11 can be recombined.

After the negative edge of the second pulse signal S2 at the time t2, the mask signal $S_{MSK}$ is at a low level, a duration starting from the time t2 to the beginning time t3 in a next period is the stop duration $T_{STOP}$, so the level of the mask signal $S_{MSK}$ is redundancy (Don't Care).

In this way, according to the control circuit 100d in FIG. 10 and FIG. 11, in the light load, the driving pulse signal S5 whose pulse quantity is changed according to the load can be generated, and the mask signal $S_{MSK}$ being at a low level in the mask duration $τ_{MSK}$ including K pulses can be generated.

According to the control circuit 100d, the following effects can be obtained in the heavy load.

When the load becomes heavier, the second pulse signal S2 continues to be maintained at the high level, operations are performed in the continuous mode that the switching element M1 is switched at the first frequency $f_1$ instead of being in the intermittent mode of repeating the driving duration $T_{DRV}$ and the stop duration $T_{STOP}$. In this case, the second pulse signal S2 is continuously maintained at the high level, so the trigger 72 of the mask signal generating portion 70 is not reset, and the mask signal $S_{MSK}$ is continuously at a high level. Thereby, in the heavy load state, all pulses including the K pulses can be used to drive the first switching transistor M1a, so the efficiency can be increased.

The technology according to the second embodiment can be combined with various variations illustrated in the first embodiment. That is, the technology can be combined with the buck, boost, or buck-boost switching power supply.

While several embodiments of the present invention have been illustrated and described, various modifications and improvements can be made by those skilled in the art. The embodiments of the present invention are therefore described in an illustrative but not in a restrictive sense. It is intended that the present invention should not be limited to the predetermined forms as illustrated and that all modifications which maintain the spirit and scope of the present invention are within the scope defined in the appended claims.

What is claimed is:

1. A control circuit for a boost, buck or buck-boost switching power supply comprising a switching element, wherein the switching element comprises a first switching transistor and a second switching transistor smaller than the first switching transistor whose respective control terminals are independent of each other and which are disposed side by side;

the control circuit is configured to repeat a driving duration enabling the switching element to be switched and a stop duration stopping the switching element from being switched in a light load state;

the control circuit comprises:

a pulse signal generating portion generating a driving pulse signal, wherein the driving pulse signal comprises at least one pulse in the driving duration, and wherein during the light load state, a number of pulses in the driving duration is less, and the pulse signal generating portion comprising:

a first oscillator generating a first period signal of a first frequency;

a second oscillator generating a second period signal of a second frequency lower than the first frequency and having a slope portion;

an error amplifier generating an error signal, wherein the error signal is corresponding to an error between a feedback signal denoting an electric state of the switching power supply and a predetermined reference voltage; and a first pulse modulator generating a first pulse signal having the first frequency and having a pulse width corresponding to the error signal and the first period signal, and clamping the pulse width of the first pulse signal at a predetermined first minimum pulse width;

a first driver driving the first switching transistor according to the at least one pulse in the driving pulse signal other than a predetermined K pulses (K is a natural number); and a second driver driving the second switching transistor according to at least the predetermined K pulses in the driving pulse signal, wherein the driving pulse signal is generated based on the first pulse signal.

2. The control circuit according to claim 1, wherein the pulse signal generating portion further comprises:

a second pulse modulator generating a second pulse signal having a pulse width corresponding to the error signal by comparing the signal corresponding to the error signal and the second period signal; and a synthesis portion synthesizing the first pulse signal and the second pulse signal to generate the driving pulse signal.

3. The control circuit according to claim 2, wherein the first pulse modulator shortens the pulse width of the first pulse signal as the error signal is reduced, and clamps the pulse width of the first pulse signal at the first minimum pulse width when the error signal is smaller than a certain threshold level; and the second pulse modulator, in a state that the pulse width of the first pulse signal is clamped, shortens the pulse width of the second pulse signal as the error signal is reduced.

4. The control circuit according to claim 2, wherein the first period signal has a slope portion changing between a first lower limit level and a first upper limit level higher than the first lower limit level;

the second period signal changes between a second lower limit level lower than the first lower limit level and a second upper limit level higher than the second lower limit level;

the first pulse modulator generates the first pulse signal by comparing the error signal and the first period signal; and the second pulse modulator generates the second pulse signal by comparing the error signal and the second period signal.

5. The control circuit according to claim 4, wherein the second upper limit level is set to be higher than the first lower limit level.

6. The control circuit according to claim 1, further comprising a mask signal generating portion, wherein the mask signal generating portion generates a mask signal being at a predetermined level in a mask duration comprising the K pulses;

the first driver stops driving the first switching transistor in a duration when the mask signal is at the predetermined level, and drives the first switching transistor according to the driving pulse signal in durations other than the duration; and the second driver drives the second switching transistor according to the driving pulse signal at least in the duration when the mask signal is at the predetermined level.

7. The control circuit according to claim 1, wherein K=1.

8. The control circuit according to claim 1, wherein in a heavy load state, the first driver drives the first switching transistor according to all pulses in the driving pulse signal.

9. The control circuit according to claim 6, wherein the mask signal generating portion fixes the mask signal at a level different from the predetermined level in a heavy load state.

10. A switching power supply, comprising:
the control circuit according to claim 1, wherein the switching element is driven by the control circuit; and;
an output circuit, comprising an inductance element-connected to the switching element, an output capacitor, and a rectifying element.

11. An electronic apparatus, comprising:
the switching power supply according to claim 10.

12. A control method for a boost, buck or buck-boost switching power supply comprising a switching element, wherein the switching element comprises a first switching transistor and a second switching transistor smaller than the first switching transistor whose respective control terminals are independent of each other and which are disposed side by side;

the control method comprises the following steps:
repeating a driving duration enabling the switching element to be switched and a stop duration stopping the switching element from being switched in a light load state;

generating a driving pulse signal, wherein the driving pulse signal comprises at least one pulse in the driving duration, and wherein during the light load state, a number of pulses in the driving duration is less;

driving the first switching transistor according to the at least one pulse in the driving pulse signal other than a predetermined K pulses (K is a natural number); and driving the second switching transistor according to at least the predetermined K pulses in the driving pulse signal, wherein the predetermined K pulses are in the driving pulse signal when the number of the pulses is reduced to K, wherein the step of generating the driving pulse signal comprises the following steps:

generating an error signal, wherein the error signal is corresponding to an error between a feedback signal denoting an electric state of the switching power supply and a predetermined reference voltage;

generating a first pulse signal of a first frequency whose pulse is modulated according to the error signal;

generating a second pulse signal, having a slope portion and a second frequency lower than the first frequency whose pulse is modulated according to the error signal; and synthesizing the first pulse signal and the second pulse signal to generate the driving pulse signal.

13. The control circuit according to claim 1, wherein the predetermined K pulses are in the driving pulse signal when the number of the pulses is reduced to K.

* * * * *